(12) United States Patent
Wang et al.

(10) Patent No.: US 7,317,847 B1
(45) Date of Patent: Jan. 8, 2008

(54) OPTICAL FIBERS, DEVICES AND METHODS FOR MAKING SAME

(75) Inventors: Liming Wang, Tinley Park, IL (US); Thomas D. Monte, Homer Glen, IL (US)

(73) Assignee: KVH Industries, Inc., Middletown, RI (US)

( * ) Notice: Subject to any disclaimer, the term of this patent is extended or adjusted under 35 U.S.C. 154(b) by 0 days.

(21) Appl. No.: 11/584,426

(22) Filed: Oct. 20, 2006

(51) Int. Cl.
*G02F 1/035* (2006.01)
*G02B 6/00* (2006.01)
*G02B 6/30* (2006.01)

(52) U.S. Cl. ................ 385/3; 385/2; 385/49; 385/122; 385/123; 385/126; 385/127; 385/141; 385/144; 385/145; 438/31

(58) Field of Classification Search ................ 385/2–3, 385/49, 122–123, 126–127, 141, 144, 145; 438/31; 356/460
See application file for complete search history.

(56) References Cited

U.S. PATENT DOCUMENTS

| 4,506,388 | A | * | 3/1985 | Monerie et al. ............ 398/205 |
| 4,630,890 | A | | 12/1986 | Ashkin et al. |
| 5,729,641 | A | | 3/1998 | Chandonnet et al. |
| 5,768,462 | A | | 6/1998 | Monte |
| 5,854,864 | A | | 12/1998 | Knoesen et al. |
| 6,041,149 | A | | 3/2000 | Monte |
| 6,047,095 | A | | 4/2000 | Knoesen et al. |
| 6,134,356 | A | | 10/2000 | Monte |
| 6,194,120 | B1 | | 2/2001 | Chan et al. |
| 6,718,097 | B2 | * | 4/2004 | Dyott ......................... 385/49 |
| 2004/0037572 | A1 | * | 2/2004 | Matsuyama ................. 398/208 |

OTHER PUBLICATIONS

Creaney et al., "Continuous-Fiber Modulator with High-Bandwidth Coplanar Strip Electrodes," 8 *IEEE Photonics Tech. Letters*. 3, pp. 355-357 (Mar. 1996).
Fawcett et al., "In-line Fiber Optic Intensity Modulator using Electro-Optical Polymer," 28 *Electronics Letters* 11, pp. 985-986 (May 21, 1992).
Nayar et al., "Electro-optic Monomode Fibre-Fevices with Liquid Crystal Overlays," *12th European Conf. on Optical Comm.*, Sep. 1986, pp. 175-179.
Smith et al., "Fabrication and analysis of a low-loss in-fiber active polymer waveguide," 43 Applied Optics 4, pp. 933-939 (Feb. 1, 2004).

* cited by examiner

*Primary Examiner*—Frank G. Font
*Assistant Examiner*—Michael P. Mooney
(74) *Attorney, Agent, or Firm*—Goodwin Procter LLP (57) ABSTRACT

The invention relates to an asymmetric optical fiber that includes a core and a functional cladding that surrounds substantially half of the core along at least a portion of the fiber. The asymmetric optical fiber may include substantially parallel electrodes disposed on a face of the optical fiber.

30 Claims, 12 Drawing Sheets

OPTICAL FIBERS, DEVICES AND METHODS FOR MAKING SAME

GOVERNMENT SUPPORT

The present invention was made with support from grant W56HCZ-04-0679 from the United States Army. The government may have certain rights in this invention.

FIELD OF THE INVENTION

The present invention relates to optical fibers or modulators with an elliptical core that includes electrodes on a surface or face of the fiber.

BACKGROUND

Centro-asymmetric optical fibers are those fibers having an asymmetric cross-section. Typically, asymmetric optical fibers include those that have one side of the optical fiber located near the optical guiding region, or core. The non-circular cross-section of the outer surface of such a fiber may have a predetermined geometric relationship to the transverse axes of the guiding regions, so that the orientation of those axes may also be ascertained from the geometry of the outer, e.g flat, surface of the fiber. The optical guiding regions are usually formed from a doped silica, with a circular cross-section.

Optical fibers can be used as phase modulators. Such phase modulators can be used, for example, in optical interferometric sensors, all-optical frequency shifting devices, and chirp control for high-speed data communications. In particular, phase modulators are an important component in fiber optic gyroscopes. Fiber optic gyroscopes (FOGs) detect the Sagnac phase shift using a fiber loop interferometer, and optimally, should do so with high rate sensitivity and bias stability. This may require elimination or reduction of any spurious signals. Elimination of such spurious signals may be satisfied by reciprocity in the overall optical circuit, and, for example, the phase modulator component must maintain polarization and exhibit a low residual intensity modulation (RIM).

For example, tactical FOGs require a modulator with an extinction ratio (ER) of better than 25 dB and a RIM less than several tens part per million. Phase modulators currently used in such gyroscopes include those based on the acoustic-optic effect, e.g. fiber wound PZT (lead zirconate titanate) electromechanical resonators, and those based on the electro-optic (EO) effect, e.g. $LiNbO_3$ integrated optical waveguides. Fiber wound PZT resonators are inexpensive, optically continuous since pigtailing is not required, exhibit near-zero insertion loss and maintain polarization. However, the fiber wound PZTs exhibit a limited electrical bandwidth (high Q) and are vulnerable to extreme mechanical shocks. $LiNbO_3$ integrated optic chips are efficient and can be broad bandwidth, but are generally more costly to produce mainly due to the stringent requirements for fiber pigtail junctions that need cumbersome angled facet and fiber-tip polish, and accurate lateral and angular alignments. Other modulator types include electrically poled optical fiber glasses, optical fibers drawn from organic electro-optic material, and those based on photonic band-gap filters, but these devices are either inefficient in modulation or difficult to modulate, e.g. such modulators have a bandwidth limit due to long modulation length.

As a result, there is a need for relatively inexpensive modulators that do not require pigtailing dissimilar waveguides, and are easy to manufacture, while exhibiting substantially wide electrical bandwidth and that display residual intensity modulation less than e.g. 100 ppm over a 7 phase modulation, and/or a low insertion loss.

SUMMARY OF THE INVENTION

This disclosure is directed, at least in part, to an asymmetric optical fiber comprising a core and a silica cladding material surrounding substantially half of the core along at least a portion of the optical fiber. The disclosed optical fibers can include at least one pair of substantially parallel electrodes disposed on a face of an asymmetric optical fiber and/or can include a functional cladding at least partially disposed over the core and electrodes. Optionally, the optical fiber core may be elliptical. In an embodiment, the optical fibers may have portion of a silica cladding surrounding substantially all of the optical core along the length of that portion of fiber, for example, with no functional cladding, and another portion of the optical fiber that includes a pair of electrodes and/or a functional cladding. The portion of optical fiber including electrodes and/or cladding may be about 2 cm or more, or about 2.5 cm or more, for example about 2 cm to about 4 cm, or about 3 cm or more.

Optical fibers of the invention may include a pair of electrodes disposed on a face of the fiber and that straddle the core of the fiber. The electrode pair may each include an electrode connector, which may be staggered with respect to other electrode connector corresponding to the pair.

Functional claddings may include an electro-optic polymer, a rare-earth doped material, a photo-chromatic material, and/or an electro-induced birefringent material. For example, the functional cladding may comprise a chromophore pendantly bound to a silicone polymer. In another embodiment, the functional cladding may be chosen so that the optical fiber of the invention has an insertion loss of less than or equal to 10 dB, or less than or equal to 7, 6, 4 or 3 dB. The refractive index of the core may be about 0.014 to about 0.034 more than the refractive index of the functional cladding.

Also contemplated herein are fiber optic gyroscopes, phase modulators, amplitude modulators, interferometers and like devices that include one or more of the disclosed optical fibers.

In another embodiment, an asymmetric optical fiber is disclosed comprising an elliptical core and a functional cladding, wherein said functional cladding surrounds substantially half of said elliptical core, and wherein said fiber has an insertion loss of less than or equal to about 10 dB.

A method for fabricating an asymmetric optical fiber comprising an elliptical core and functional cladding is also provided herein, wherein the method comprises removing a portion of silica cladding from the optical fiber to at least partially expose the elliptical core, creating a pair of metal electrodes on a face of the asymmetric fiber and with each of the set of electrodes on an opposing side of the core. Such a method may include cladding the exposed core and electrodes with the functional cladding, so that, for example, the functional cladding is disposed substantially on the electrodes. In some embodiments, the elliptical core remains intact during the removing step. In other embodiments, the disclosed methods may further comprise embedding the optical fiber on a substrate. Such an embedding step may include spin coating the substrate with an uncured adhesive, placing the fiber on the adhesive, and curing the adhesive.

BRIEF DESCRIPTION OF THE DRAWINGS

The invention is illustrated but is not limited by the annexed drawings, in which.

DETAILED DESCRIPTION

The invention is based, in part, upon the discovery that it is possible to create an asymmetric optical fiber that includes a functional cladding and that has an insertion loss of less than 10 dB. The disclosed optical fibers may includes electrodes on a face of the optical fiber. This form of fiber is advantageous at least in part because it is easy to fabricate and can be used in broad-band, in-line fiber optic devices.

Figure 1:
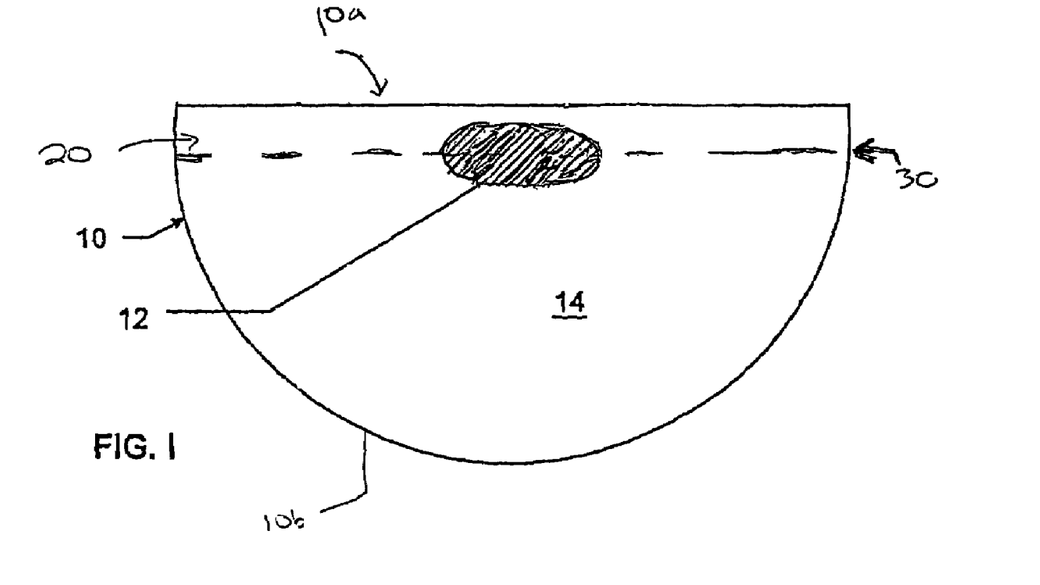
FIG. 1 is a transverse cross-section view of an optical fiber having an asymmetric configuration and an elliptical core.

In an embodiment, such a fiber is shown in FIG. 1. Optical fiber 10 is shown in transverse cross-section. Fiber 10 may be comprised of a fiber core 12 and a cladding 14. Core 12 may be elliptical, as shown in FIG. 1, or may be another shape that for example supports desired modes within fiber 10. Fiber core 12 may be substantially asymmetric with respect to the center of cladding 14, with core 12 closer to one surface portion 10a, of cladding 12 than to a remaining surface portion 10b of cladding 14. Such a surface area 10a can also be referred to as a face of optical fiber 10. Surface area 10a may be, in some embodiments, a substantially flat surface, e.g. a substantially flat face of fiber 10. In some embodiments, optical fiber 10 is an optical D-shaped fiber, as known to those skilled in the art.

Cladding 14 may have minimal or substantially no electro-optic properties and may comprise silica. For example, cladding 14 may consist essentially of silica or may include a small amount of fluorine. In some embodiments, cladding 14 may be referred to as silica cladding. Core 12 may comprise or may be fabricated from a doped silica such as for example germanium doped silica. For example, core 12 may include a doped silica that comprises about 25% germanium, or a germanium alloy or blend.

Core 12 may have a higher index of refraction than silica cladding 14, resulting in a substantially high core/cladding index difference. A higher index of refraction in the core is required for wave-guiding of light. For example, a core that includes a silica doped with about 25% germanium results in a core/cladding index difference (e.g. 0.035) and a confined mode field size (e.g. about 2.8×3.9 µm to the 1/e of the peak electric field). A core that comprises germanium, e.g about 25% germanium, may be advantageous for the manufacture of the fiber disclosed herein which may require etching of the silica cladding 14, e.g. such a core may improve the selectivity of such etching. In a preferred embodiment, core 12 is not etched and remains substantially intact after any etching process. In an embodiment, optical fiber 10 may be capable of a light polarization holding transmission at 825 nm wavelength.

Silica cladding 14, may surround substantially half, e.g. a lower half, of an elliptical core 12, along at least a portion of fiber 10. For example, FIG. 1 shows cladding 14 surrounding elliptical core 12 below line 30, which bifurcates core 12. In some embodiments, cladding 14 does not extend substantially above line 30 along at least a portion of fiber 10, for example along about 2 cm or more, e.g. 2-3 cm, 2-4 cm, or more. In other embodiments, cladding 14 extends substantially up to line 30.

As shown in FIG. 1, optical fiber 10 also includes functional cladding 20. Optical fiber 10 may include functional cladding 20, or a layer of optical material, such that functional cladding 20 surrounds substantially half, e.g. an upper half, of elliptical core 12. For example, FIG. 1 shows functional cladding 20 surrounding elliptical core 12 above line 30, which bifurcates core 12.

Functional cladding 20, which may be referred to optical cladding 20, may comprise materials that are transmissive of light propagating through fiber 10 and/or materials that have optically useful properties, e.g. materials responsive to the intensity and/or orientation of an electric field.

For example, functional cladding 20 may comprise one or more of an electro-optic polymer, a thermo-optic material, a rare-earth doped material, a photo-chromatic material, a high-verdet constant material, an electro-induced birefringent material and/or a material with light amplification properties. An "electro-optic material" or "electro-optic polymer" refers to a material or polymer that is capable of changes in the refractive index induced by the application of an applied electric field. This applied electric field is not the electric field of a light wave, but a separate field.

Exemplary optical materials include those that have, for example, a substantial second order electro-optic coefficient or for example a substantial third order electro-optic coefficient, e.g. a material capable of a substantially large Kerr effect. These type of optical materials may be referred to as "Kerr" materials. Electro-optic polymers, as is known to those skilled in the art, includes those polymers that comprise non-linearly optically active chromophores. Such polymers include polymeric compositions that include chromophores, e.g disperse red, a polymer matrix with chromophores bound to the matrix, e.g. pendantly bound to a monomeric unit or other unit, of the polymer, and polymers that are non-linearly optically active themselves, e.g. comprise a backbone with a non-linearly active component. In some embodiments, the refractive index of an electro optic polymer is at least partially dependent on the loading amount of chromophore bound to the polymer or within or on a polymeric composition.

Functional cladding 20 may comprise a silicone gel or a flexible silicone polymer, that further includes a non-linear optical chromophore. An optical material that is substantially flexible, e.g. a gel, may facilitate manufacture of the optical fiber 10, and/or may render optical fiber 10 substantially flexible, and/or may facilitate in-situ poling efficiency, as described below. For example, functional cladding 20 may comprise a silicon based polymer that is derived, for example, from triethoxysilane and/or fluoropropyltrimethoxysilanes such as triflouropropyltrimethyoxysilane monomers, and may include monomeric units comprising triethoxysilane and/or e.g. triflouropropyltrimethyoxysilane. Functional cladding 20 may include fluorine moieties in the polymer backbone that, for example, may facilitate higher chromophore loading and/or may lower the background refractive index.

Figure 2:
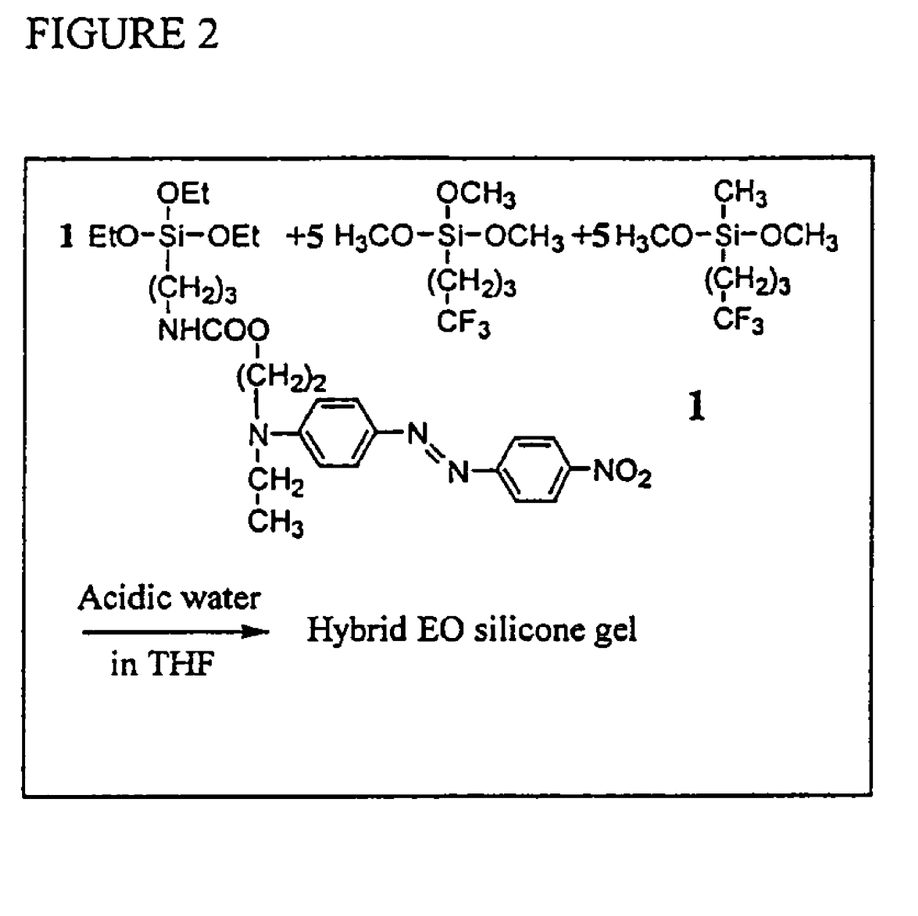
FIG. 2 depicts a synthetic route, using a sol-gel approach, to a fluoro-silicone electro-optic material that includes a chromophore.

FIG. 2 shows a synthetic route, using sol-gel techniques, to a exemplary electro-optic silicone gel that incorporates disperse red 1 (DR1). In this exemplary synthetic method, the DR1 chromophore is first linked to a triethoxysilane. The DR1 bearing triethoxysilanes are then hydrolyzed in acidic water and condensed together with trifluoropropylytrimethoxysilanes and trifluoropropyldimethoxymethylsilanes, with an exemplary molar ratio of 1:5:5. The molar ratios of the monomeric units may vary, however, so that a suitable glass transition temperature ($T_g$) and desirable refractive index is obtained. In the exemplary polymer 1 shown in FIG. 2, introduction of fluorine to the silicone gel backbone enables a 9 mol % (15 wt %) DR1 loading. Such chromophore loading may vary to achieve a desirable refractive index, e.g. the chromophore loading may be about 8% to about 20 mol % loading, or about 8% to about 12% mol loading. The exemplary optical material 20, polymer 1, shown in FIG. 2 has a refractive index of 1.466 at 800 nm, lower than the index of the fiber core, and a room temperature $T_g$. The thermo-optic coefficient of polymer 1 is about $-1.43 \times 10^{-4} K^{-1}$.

In some embodiments, functional cladding 20 has a refractive index that is more than the refractive index of cladding 14, and less than the core refractive index. In some embodiments, the core refractive index is 1.4825, and the cladding 14 refractive index is 1.450 at about 800 nm. The refractive index of the core 12 may be for example about 0.014 to about 0.034 higher than silica cladding 14.

Figure 3:
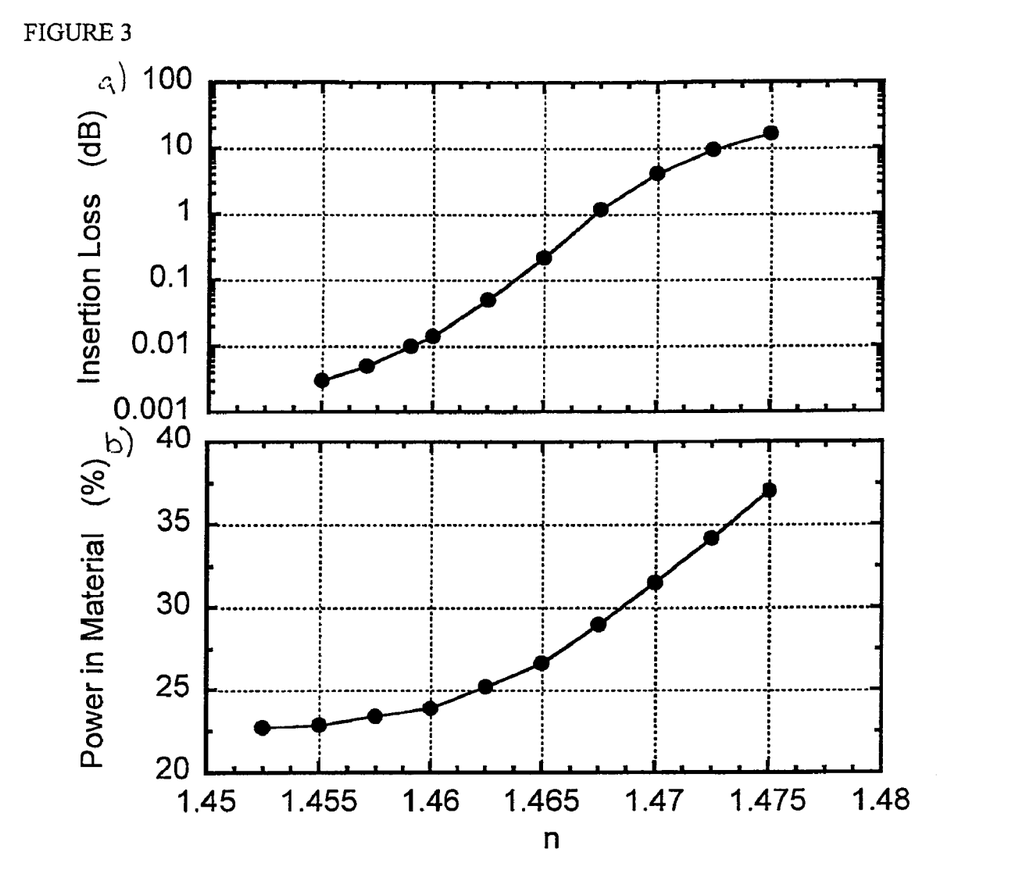
FIG. 3 depicts BeamPROP™ simulation results of an optical fiber showing the dependencies of the refractive index of the material that replaces the upper half of the fiber cladding, on the insertion loss (a), and on percentage of the evanescent light power distributed in the functional cladding (b)

FIG. 3 shows the results of a modeled composite fiber or waveguide using the commercial BPM software package BeamPROP™. The waveguide model includes 500 μm of standard elliptical core optical fiber on either side of a section of 1000 μm-long composite waveguide that incorporates an electro-optical material in upper half of the elliptical core cladding. Matlab® 6.1 was incorporated during the simulations to define the cross-sectional index distribution of the composite waveguide and the gradual transition between the regular fibers and the composite fiber waveguide. The percentage of evanescent field in the electro-optic cladding was calculated by accumulating the field strength at each pixel representing the electro-optic cladding material. As FIG. 3 illustrates, the overall insertion loss and percentage of the power in an electro-optic material are dependent on the refractive index of the material. Because the refractive index of electro-optic material may be dependent on the chromophore loading, in some embodiments, there can be a compromise between chromophore loading and fiber optic insertion loss. For example, this model indicates that an optical fiber with an insertion loss of less than about 1 dB may require an optical cladding with a refractive index of less than about 1.467 at 800 nm. FIG. 3b shows that such an optical fiber has 25% of the optical power confined in the electro-optic material.

Figure 4:
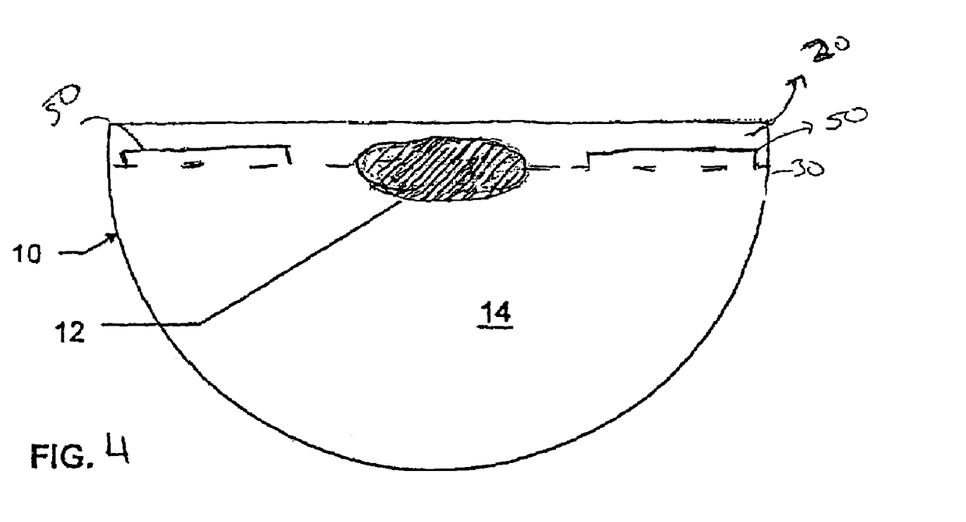
FIG. 4 depicts a transverse cross-section view of an optical fiber having an asymmetric configuration and an elliptical core with parallel electrodes.
Figure 5:
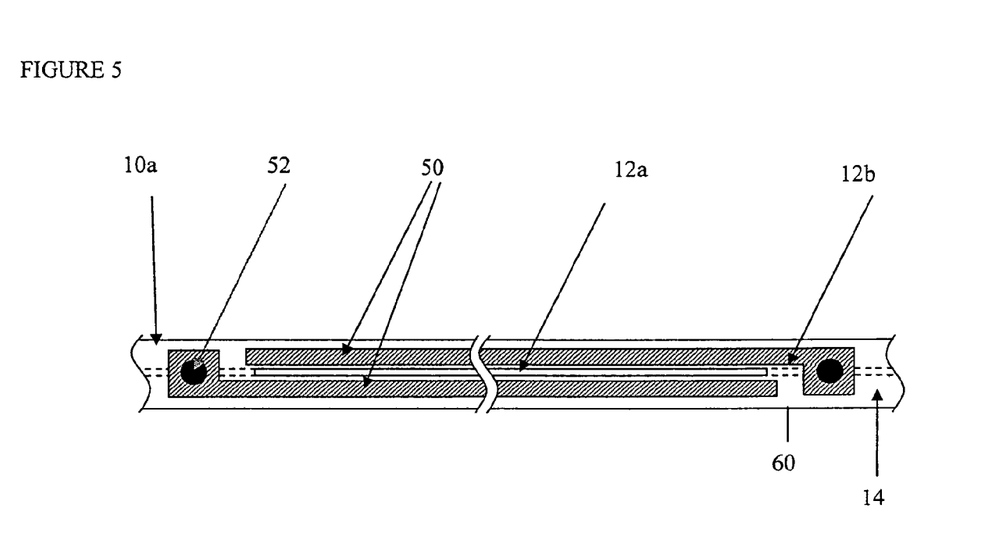
FIG. 5 depicts a longitudinal section of an optical fiber having parallel electrodes and electrode connectors on the fiber.

Optical fiber 10 may also include an electrode pair 50, as shown in FIGS. 4 and 5. Electrode pair 50 may be parallel electrodes on the flat face of optical fiber 10, and placed on either side of the core 12, and may be for example, gold microstrip electrodes. The connections of electrode pair 50 may be staggered with respect to each other along the direction of the fiber. For example, one of the electrode pair may extend, e.g. about 5 mm further along the fiber than the other electrode. Such staggering may facilitate mending of broken electrodes, or creating electric connections, using simple tin solder or gold wire bonding. In some embodiments, there is no apparent damage to either of electrode pair 50 when 1000 volts or more is applied to the electrodes in an optical fiber 10.

As shown in FIG. 4, electrode pair 50 may be disposed between silica cladding 14 and functional cladding 20, e.g. when a DC bias voltage is applied across the electrode pair. Such an electrode pair 50 facilitates in-situ poling of optical material 20. As understood by those skilled in the art, the application of the electric field to functional cladding 20, e.g. an electro-optic material, can be referred to as "poling." The field of a propagating wave distributed in the elliptical core extends beyond the interface of the core with silica cladding 14 or functional cladding 20, decaying exponentially from the interface into silica cladding 14 and/or functional cladding 20. Applying an electric field to functional cladding 20 may change the refractive index of a electro-optic cladding material close to the core/optical material interface, which induces the effective refractive index change of the composite waveguide and consequently the relative phase of the guiding light will be shifted.

FIG. 5 shows a bird's eye view of a longitudinal section of optical fiber 10, with a flat face 10a, and electrode pair 50 straddling exposed core 12a. FIG. 5 depicts an optical fiber before any functional cladding is applied. Silica cladding 14 has not been removed and/or replaced along a different portion of fiber 10, as shown along section 60 and with the core 12b substantially surrounded by silica cladding 14. Electrodes 50 and electrode connections 52, which may be referred to as a soldering point 52, are on the face of fiber 10a.

Figure 6:
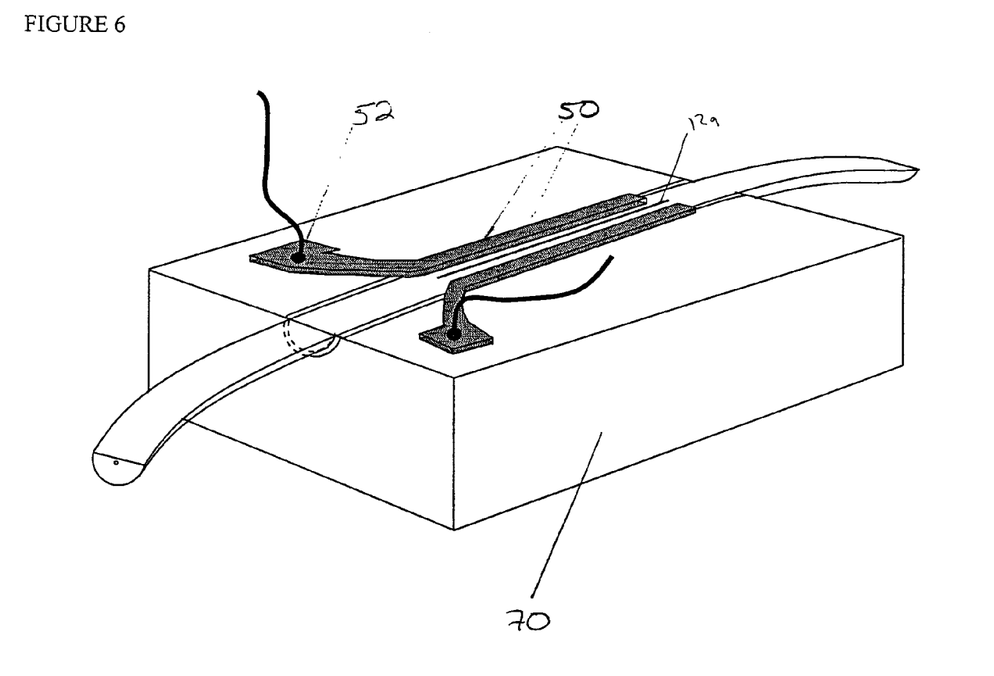
FIG. 6 depicts an optical fiber embedded in a substrate with electrode connectors on the substrate.

In alternate embodiment, as shown in FIG. 6, electrode connections 52 may be placed on substrate 70, while electrode pair 50 is disposed on the face of the fiber and straddle the optical fiber core.

The optical fibers disclosed herein may be fabricated as described below for purposes of illustration and without any intention to limit the scope of the present invention. Disclosed optical fibers may be fabricated by pre-etching an asymmetric fiber that includes a germanium doped core. To expose the core, the optical fiber can be pre-etched using an acid, e.g. 25% HF acid, to remove the bulk of the silica material near the flat. The final several microns of the upper silica cladding can then be selectively etched using a buffered oxide etchant (BOE) for example, a etchant with a 20:1 $NH_4F$:HF ratio. BOE etches the silica cladding 20 more than 10 times faster than the gemania doped core. To facilitate the etching precision, a polarimetric etch monitor may be set up to in-situ measure the etching depth. The etching process can be optimized to expose half of the elliptical core with high accuracy and repeatability, and the length of the core-exposed section can be controlled as the same length of the electrodes.

Figure 7:
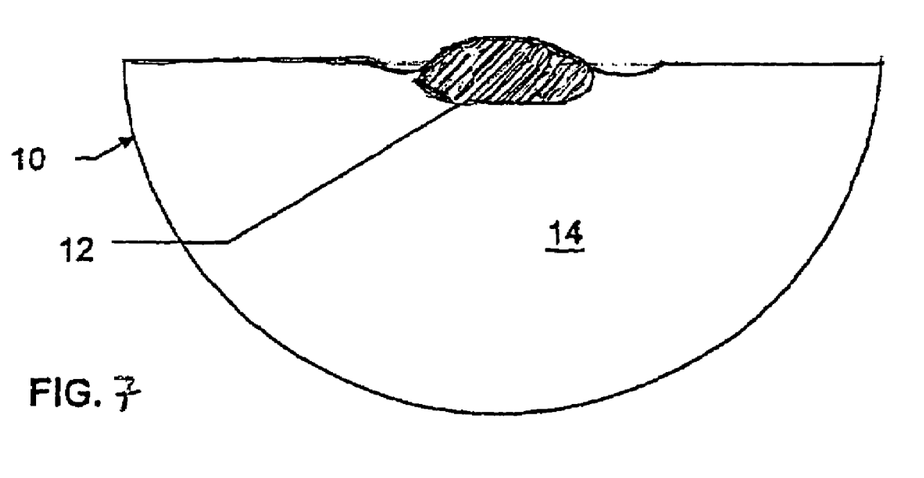
FIG. 7 depicts a transverse cross-section view of an optical fiber having an asymmetric configuration and an elliptical core with half of the core exposed.

Such etching may expose the core gradually such that the length from the point that the core barely exposed to its half exposure is, for example, approximately 140 μm. A gradual transition from the fiber to the composite or electro-optic fiber waveguide may render a low transmission loss clad replacement. An exemplary cross-sectional representation of a core-exposed fiber is shown in FIG. 7.

Figure 8:
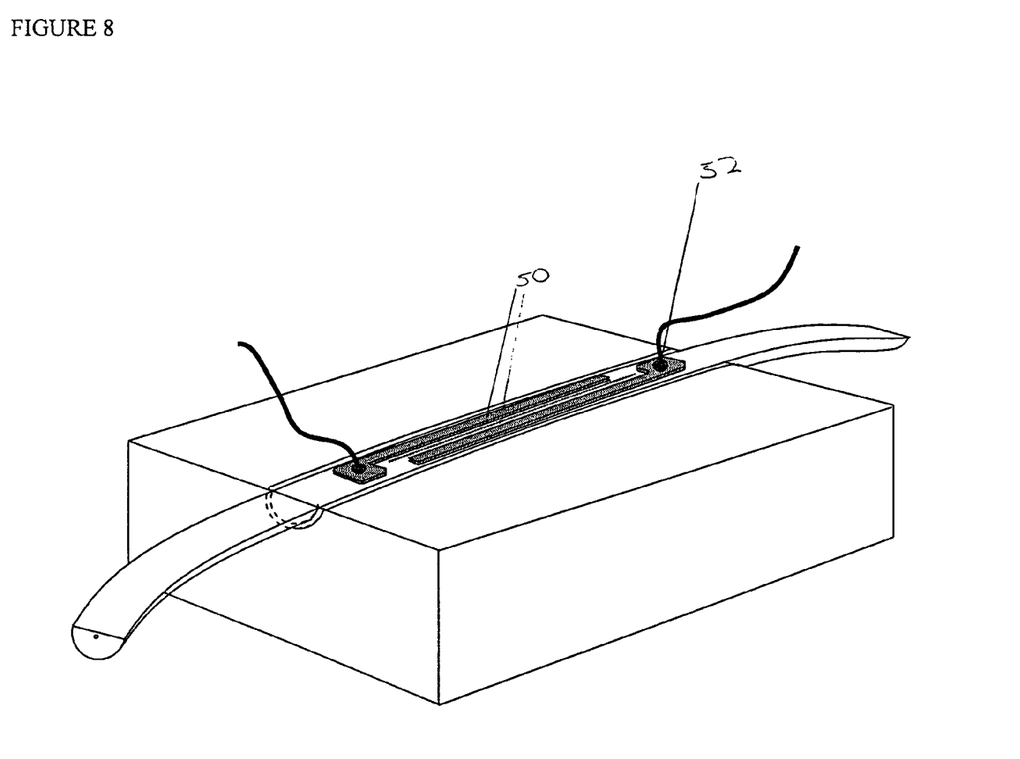
FIG. 8 depicts an optical fiber embedded in a substrate with electrode connects on the fiber.

The etched fiber can then be embedded on a planner substrate in preparation for a subsequent electrode fabrication, as shown in FIG. 8. The substrate may be prepared by spin-coating an un-cured adhesive on a substrate. The etched fiber may then be placed or embedded straight with the flat surface parallel to the substrate surface, onto the adhesive. The adhesive, if used, is then cured.

The electrodes may then be created or deposited on the face of the etched fiber using for example, conventional metal deposition, lithographic patterning, and electro-plating techniques. For example, a metallic layer, such as a gold layer, with a thin layer of an adhesion promotor, e.g. chromium may be vacuum sputtered onto the core-exposed fiber. The electrodes can then be patterned on a face of the optical fiber by means known to those skilled in the art, e.g. by a lithographic system. For example, a pair of parallel electrodes, each approximately 30 cm wide on flat, can be created or fabricated to straddle the exposed core and overlap for a distance of 25 mm with a gap distance of 15 μm and with a measured impedance to 50Ω.

An electro-optic material or cladding may then be cast over the exposed core and electrodes, replacing substantially the upper half of the elliptical core's original non-electro-optical cladding. The embedded fiber can then be peeled from the bulky substrate. Since the electrodes are, for example, substantially thoroughly on the fiber flat, a good electric connection is retained after the release from the substrate. The release of the fiber optic from the substrate may be facilitated by a flexible electro-optic polymer.

Figure 9:
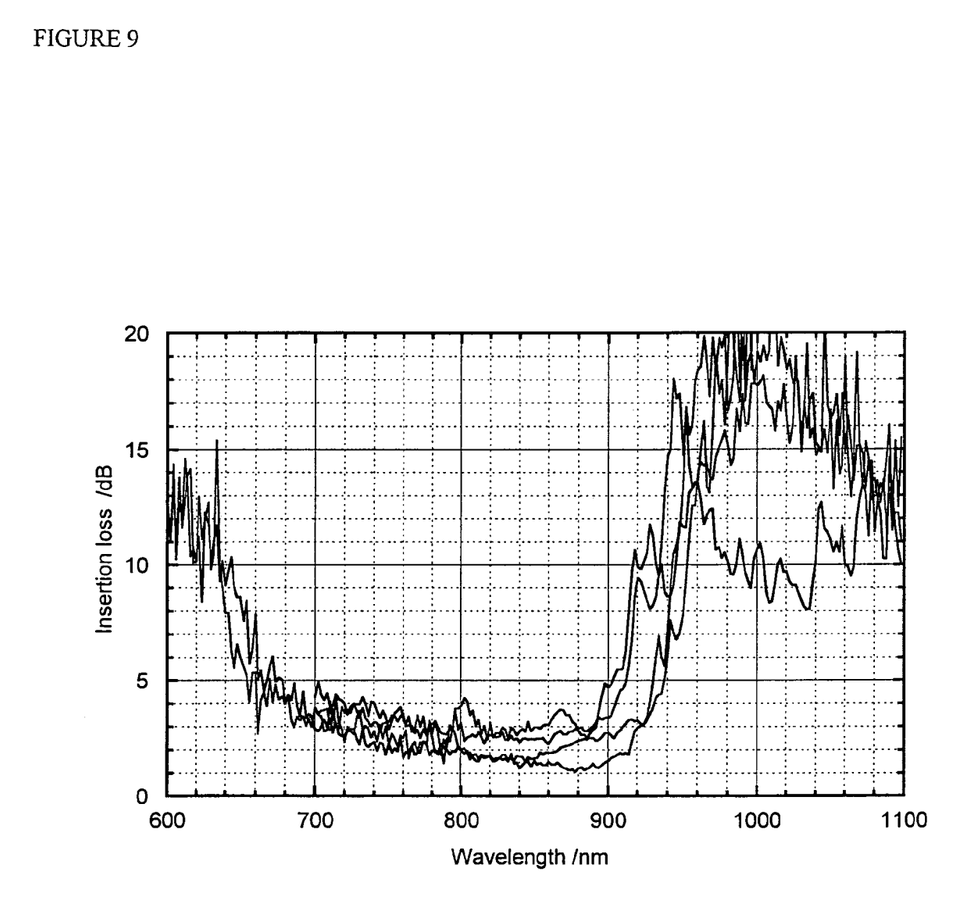
FIG. 9 depicts insertion loss of four modulators built for an operation wavelength of 820 nm, as a function of wavelength of transmitted light.

The insertion loss of the disclosed modulators or optical fiber may be, for example, about 3 to about 6 dB at the gyro operation wavelength of 825 nm. For example, the insertion loss may be less than 4 dB, less than 6 dB, less than 10 dB or between about 1 dB and about 4 dB, or between about 1 dB and about 7 dB. In some embodiments, the extinction ratio for the disclosed modulators or optical fibers is more than about 20 dB. FIG. 9 shows insertion loss of less than 3 dB of four modulators disclosed herein built for operation wavelength of 820 nm, as a function of wavelength of the transmitted light.

Figure 10:
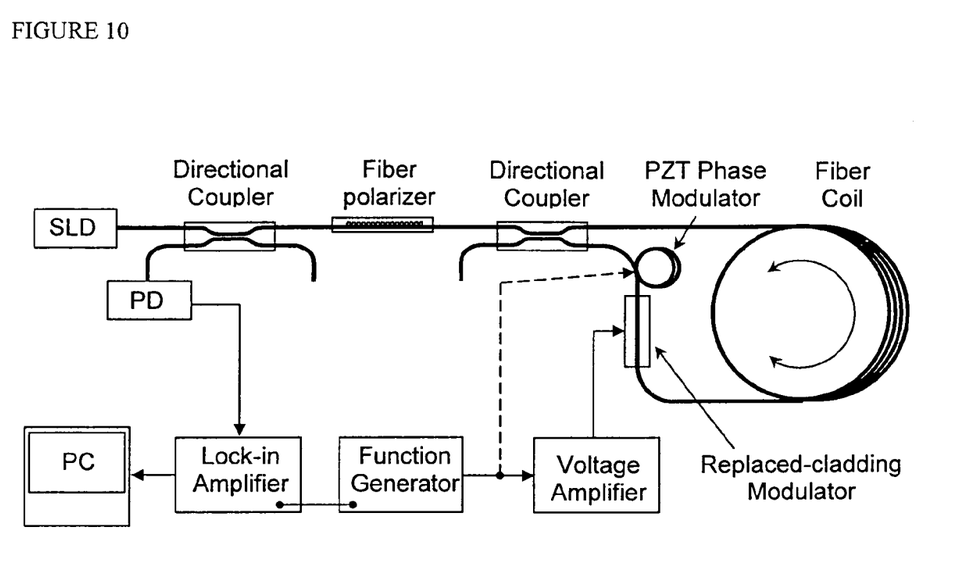
FIG. 10 pictorially depicts an all fiber, open-loop FOG that can be used to measure the phase and the RIM modulations of optical fiber and that include a superluminescent diode (SLD) and a photodiode (PD)

The phase modulation and/or the RIM, of the optical fibers disclosed herein can be measured, for example, in an all-fiber, open-loop FOG. Such an exemplary FOG system configuration is schematically shown in FIG. 10. Single mode light, from a pigtailed super-luminescent diode, passes through the first coupler and is linearly polarized with a fiber polarizer, and then enters a 50/50 split PM coupler as an interferometric coupler. The gyroscopic loop is a coil of diameter of 8 cm that consists of a 755 m long elliptical core D-shape fiber. A modulator or optical fiber disclosed herein is spliced into the fiber loop close to the coupler. A reference fiber wound PZT electromechanical phase modulator with known properties is spliced adjacent to the replaced-cladding modulator in the loop to provide a means of calibration for the phase shift measurement. The returning light signal from the loop, counter-propagates through the polarizer, is split by the first coupler, received and demodulated using a photo-detector, a low noise trans-impedance amplifier and a phase sensitive lock-in amplifier at the modulation frequency of 134.68 kHz.

Figure 11:
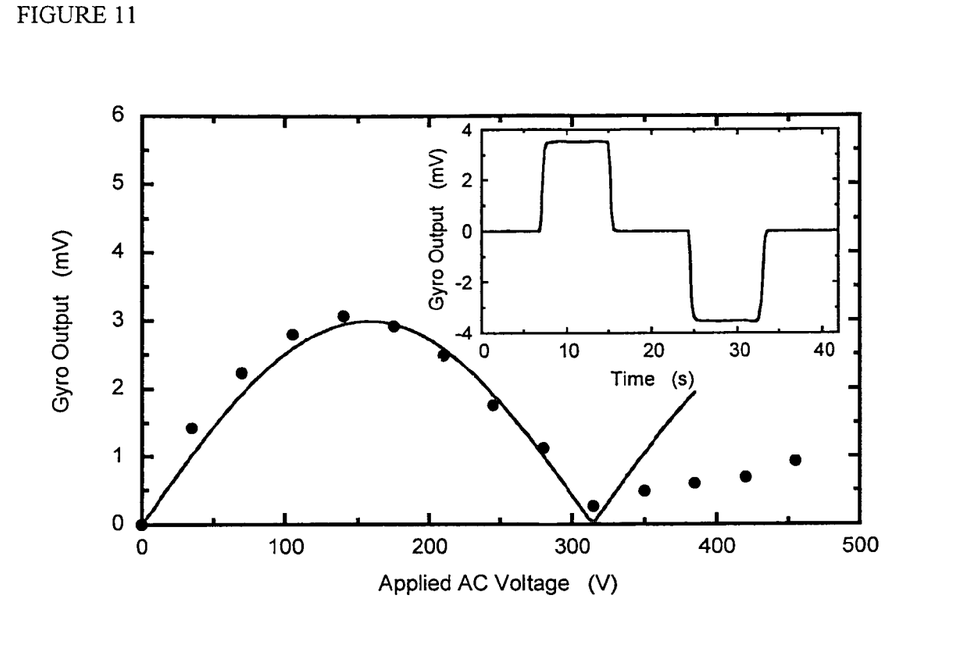
FIG. 11 depicts the output of a FOG as a function of modulating voltage applied to the modulator; the solid line is a fitting to the first order Bessel function; the insert is the FOG output of the calibration PZT modulator working at 1.82 radians with a rotation rate of +50°/sec and then −50°/sec.

Modulating voltage was applied to a gyroscope with an optical fiber that includes optical cladding of material depicted in FIG. 2. When the modulating voltage applied to the modulator is increased, the gyro output reaches to its maximum then decreases to near zero as shown in FIG. 11. During this measurement, the gyroscope was turning at a constant rate of 50°/sec. The maximum output corresponds to the first vertex of the first order of Bessel function, $J_1$, which is at 1.82 radians phase modulation. When the output null is reached, the phase shift is 3.83 radians.

The insert of the FIG. 11 depicts a gyro output at a rate of 50°/sec when the calibration PZT modulator was used. The PZT modulator worked at 1.82 radian modulation and the other conditions were the same. Using the parameters of a disclosed optical fiber with an effective voltage Vrms=320V for 3.83 radians phase shift, light-field/electric-field overlap factor κ=25%, and the electrode parameters, a product r33Γ can be calculated as 3.7 pm/V, where Γ is a normalized modulating filed in the electro-optic material with respect to the field that would be there if air were the dielectric.

Figure 12:
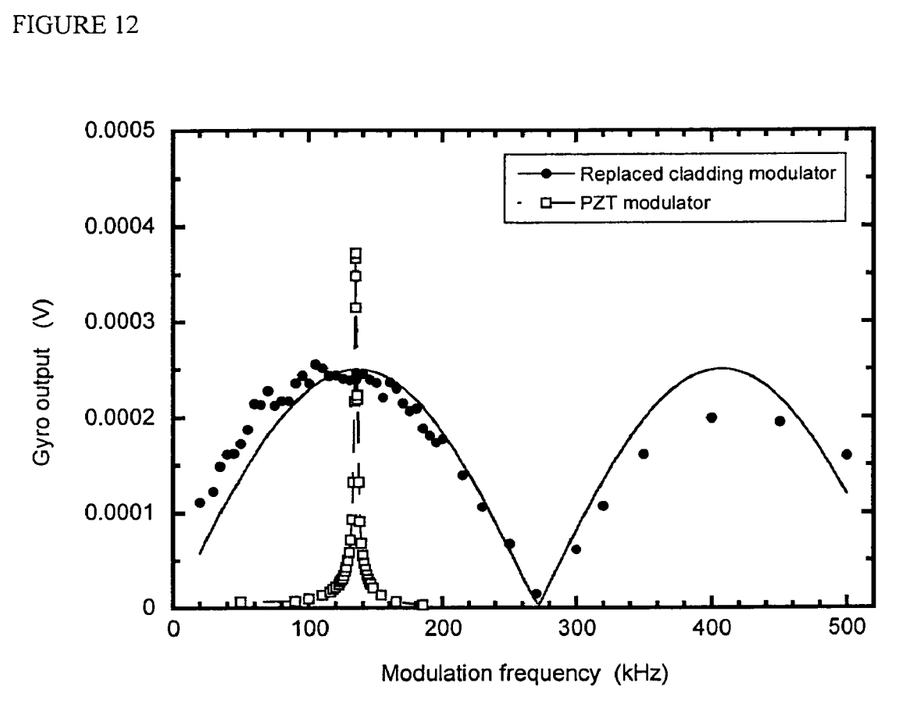
FIG. 12 depicts the output of a FOG as a function of modulation frequency (filled circles) and a standard PZT modulator (squares); the solid line is a fit to the first order Bessel function and the data were corrected by considering the frequency roll-off of the detector.

A disclosed modulator may have less than about 100 ppm RIM, on a 25-mm long in-line polarization maintaining fiber modulator. In an embodiment, the disclosed optical fibers or phase modulators has a substantially broad bandwidth. Using the exemplary FOG outlined above, the FOG output was measured as a function of modulation frequency with the turning rate was kept constant, as depicted in FIG. 12.

The entire disclosure of each of the documents referred to herein is incorporated by reference for all purposes. Although the present invention has been illustrated by means of preferred embodiments thereof, it is understood that the invention intends to cover broad aspects thereof without departing from the spirit and scope of the invention as defined in the appended claims.

What is claimed is:

1. An asymmetric optical fiber comprising a core and a silica cladding material surrounding substantially half of said core along at least a portion of said fiber;
   at least one pair of substantially parallel electrodes disposed on a face of said asymmetric optical fiber; and
   a functional cladding at least partially disposed directly on said core and electrodes.

2. The asymmetric optical fiber of claim 1, wherein said core is substantially elliptical.

3. The asymmetric optical fiber of claim 1, wherein said portion is greater than about 2 cm.

4. The asymmetric optical fiber of claim 3, wherein said portion is about 2 cm to about 4 cm.

5. The optical fiber of claim 1, wherein said pair of electrodes straddle said core.

6. The optical fiber of claim 5, wherein said pair of electrodes each includes an electrode connector.

7. The optical fiber of claim 6, wherein said electrode connector is staggered with respect to other electrode connector.

8. The optical fiber of claim 7, wherein said electrode connector is disposed on the face of said optical fiber.

9. The optical fiber of claim 7, wherein said electrode connector is disposed on a substrate disposed adjacent to said optical fiber.

10. The optical fiber of claim 1, wherein said functional cladding comprises at least one of: an electro-optic polymer, a rare-earth doped material, a photo-chromatic material, and/or an electro-induced birefringent material.

11. The optical fiber of claim 10, wherein said functional cladding comprises an electro-optic polymer.

12. The optical fiber of claim 11, wherein said functional cladding comprises a chromophore pendantly bound to a silicone polymer.

13. The optical fiber of claim 1, wherein said functional cladding is chosen so that said optical fiber has an insertion loss of less than or equal to about 10 dB.

14. The optical fiber of claim 13, wherein said insertion loss is less than or equal to about 6 dB.

15. The optical fiber of claim 13, wherein the refractive index of said core is about 0.014 to about 0.034 more than the refractive index of said functional cladding.

16. A device comprising the optical fiber of claim 1.

17. The device of claim 16, where said device is a fiber optic gyroscope.

18. The device of claim 16, wherein said device is a phase modulator.

19. The device of claim 16, wherein said device is an amplitude modulator.

20. The device of claim 16, wherein said device is an interferometer.

21. An asymmetric optical fiber comprising an elliptical core and a functional cladding, wherein said functional cladding surrounds substantially half of said elliptical core, and wherein said fiber has an insertion loss of less than or equal to about 10 dB.

22. The asymmetric optical fiber of claim 21, further comprising at least one pair of substantially parallel electrodes disposed on a face of said asymmetric optical fiber.

23. The asymmetric optical fiber of claim 22, wherein said functional cladding is disposed on said electrodes.

24. The asymmetric optical fiber of claim 22, wherein said pair of electrodes straddle said elliptical core.

25. A method for fabricating an asymmetric optical fiber comprising an elliptical core and functional cladding, the method comprising:

removing a portion of silica cladding of said optical fiber to at least partially expose the elliptical core; and wherein said elliptical core remains intact;

creating a pair of metal electrodes on a face of said asymmetric optical fiber, wherein each of the set of electrodes is disposed on an opposing side of the elliptical core; and cladding, at least partially, the exposed core and electrode with said functional cladding.

26. The method of claim 25, wherein said removing comprises applying a buffered oxide etchant to said silica cladding.

27. The method of claim 25, further comprising embedding said optical fiber on a substrate.

28. The method of claim 27, wherein said embedding step comprises:

spin coating said substrate with an uncured adhesive; and placing said fiber on said adhesive; and curing said adhesive.

29. The method of claim 25, wherein said functional cladding comprises a polymer.

30. The method of claim 29, wherein said functional cladding comprises a chromophore covalently bound to a polymer backbone.

* * * * *